(12) United States Patent
Aubauer

(10) Patent No.: US 7,835,913 B2
(45) Date of Patent: Nov. 16, 2010

(54) SPEAKER-DEPENDENT VOICE RECOGNITION METHOD AND VOICE RECOGNITION SYSTEM

(75) Inventor: Roland Aubauer, München (DE)

(73) Assignee: Siemens Aktiengesellschaft, Munich (DE)

( * ) Notice: Subject to any disclaimer, the term of this patent is extended or adjusted under 35 U.S.C. 154(b) by 847 days.

(21) Appl. No.: 10/550,481

(22) PCT Filed: Mar. 3, 2004

(86) PCT No.: PCT/EP2004/002137

§ 371 (c)(1), (2), (4) Date: Sep. 23, 2005

(87) PCT Pub. No.: WO2004/086360

PCT Pub. Date: Oct. 7, 2004

(65) Prior Publication Data

US 2007/0100632 A1    May 3, 2007

(30) Foreign Application Priority Data

Mar. 25, 2003   (DE) ................................. 103 13 310

(51) Int. Cl.
*G10L 21/00* (2006.01)
*G10L 11/00* (2006.01)
(52) U.S. Cl. ....................................... 704/275; 704/270
(58) Field of Classification Search .................. 704/10, 704/251, 275, 270
See application file for complete search history.

(56) References Cited

U.S. PATENT DOCUMENTS

| 5,774,841 | A | | 6/1998 | Salazar et al. | |
|---|---|---|---|---|---|
| 5,832,429 | A | * | 11/1998 | Gammel et al. | 704/255 |
| 5,852,801 | A | * | 12/1998 | Hon et al. | 704/244 |
| 5,852,804 | A | | 12/1998 | Sako | |
| 6,185,530 | B1 | * | 2/2001 | Ittycheriah et al. | 704/255 |
| 6,327,566 | B1 | * | 12/2001 | Vanbuskirk et al. | 704/257 |
| 6,477,498 | B1 | * | 11/2002 | Gortz et al. | 704/275 |
| 6,587,824 | B1 | * | 7/2003 | Everhart et al. | 704/275 |
| 6,873,951 | B1 | * | 3/2005 | Lin et al. | 704/251 |
| 7,299,187 | B2 | * | 11/2007 | Tahara et al. | 704/275 |

FOREIGN PATENT DOCUMENTS

DE        199 42 869        3/2001

(Continued)

OTHER PUBLICATIONS

Holmes, John N. & Holmes, Wendy, "Speech synthesis and recognition," Taylor & Francis, 2001, pp. 109-110.*
XP-007001131—Eike Gegenmantel; VOCAPI—Small Standard API for Command and Control 6th European Conference on Speech Communication and Technology, Sep. 5-9, 1999, ?Bd. 2, pp. 927-930, Budapest, Ungarn.

(Continued)

*Primary Examiner*—Vijay B Chawan
*Assistant Examiner*—Jialong He
(74) *Attorney, Agent, or Firm*—King & Spalding L.L.P.

(57) ABSTRACT

A speaker-dependent speech recognition method is provided involving the use of a speech recognition system, during which voice utterances of the user are trained, and commands are assigned to the trained voice utterances. The present disclosure seeks to carry out a training of new commands in a time-saving manner. To this end, in the event of a non-recognition of a voice utterance, the speech recognition system provides the user with the opportunity to immediately assign the voice utterance to a new command.

9 Claims, 1 Drawing Sheet

FOREIGN PATENT DOCUMENTS

| | | |
|---|---|---|
| DE | 101 22 828 | 11/2002 |
| JP | 57102699 | 5/1982 |
| JP | 584198 | 1/1983 |
| JP | 2000029585 | 1/2000 |
| JP | 2000259172 | 9/2000 |

OTHER PUBLICATIONS

Translation of Abstracts, from German to English, for both Japanese Patent Application No. JP 57-64800, filed Apr. 20, 1982; and JP 2001-350492, filed Dec. 12, 2001.

* cited by examiner

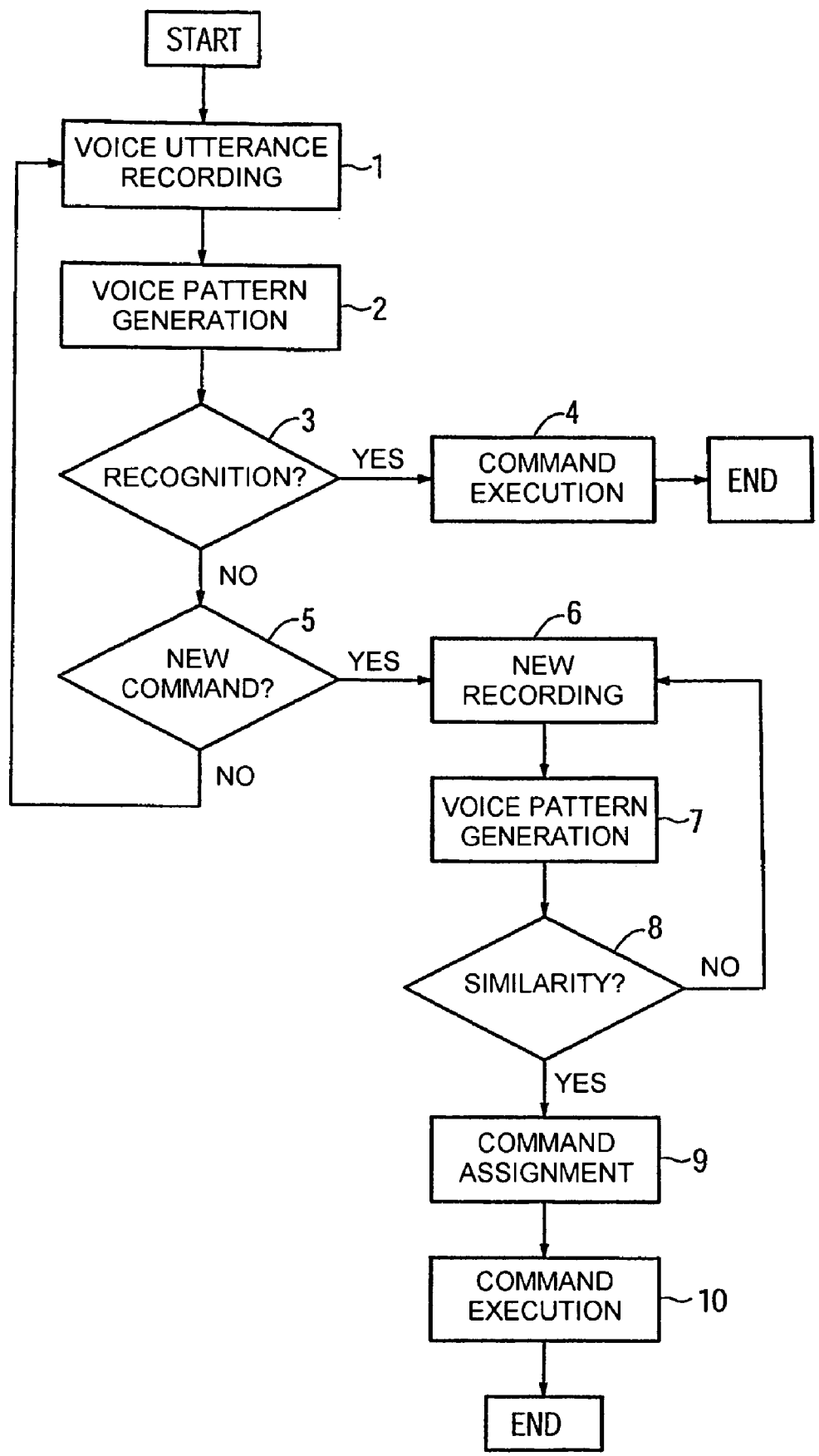

SPEAKER-DEPENDENT VOICE RECOGNITION METHOD AND VOICE RECOGNITION SYSTEM

CROSS-REFERENCE TO RELATED APPLICATIONS

This application is a U.S. national stage application of International Application No. PCT/EP2004/002137 filed Mar. 3, 2004, which designates the United States of America, and claims priority to German application number 103 13 310.0 filed Mar. 25, 2003, the contents of which are hereby incorporated by reference in their entirety.

FIELD OF TECHNOLOGY

The present disclosure relates to a speaker-dependent speech recognition method with a speech recognition system, in which voice utterances of a user are trained and commands are assigned to the trained voice utterances, and to a speech recognition system for carrying out the method.

BACKGROUND

According to the prior art, such a method is divided into a speech recognition mode and a training mode. In the speech recognition mode, voice utterances of the user are detected whereupon a command assigned to the voice utterance is found in a database if the voice utterance exhibits sufficient correspondence with a voice utterance which belongs to the command and was recorded and stored at an earlier time. In the speech recognition mode, a new assignment between a new voice utterance and a new command is not possible. Instead, these processes take place in the training mode in which the user utters voice utterances and assigns a command to each individual voice utterance after it has been recorded. The assignment obtained is stored in the database. Assigned commands can be, for example, dialing processes for subscribers to a communication network or voice control commands.

The method according to the prior art has the disadvantage that the training of new commands is complicated inasmuch as it is necessary for the user to actively switch from the speech recognition mode to the training mode every time. This also has a negative effect on the market acceptance of speech recognition systems.

On the basis of this, the present disclosure seeks to specify a speaker-dependent speech recognition method and a speech recognition system for this in which new commands can be trained in a time-saving manner.

SUMMARY

The present disclosure achieves this with regard to the method of the type initially mentioned in that upon non-recognition of a speech utterance, the speech recognition system provides the user with the opportunity to immediately assign the voice utterance to a new command.

When carrying out the inventive method, a speech recognition system is always in the speech recognition mode, but the option is available immediately to perform a new command assignment upon non-recognition of a voice utterance. In this manner, the training of new commands is integrated into the speech recognition itself and can take place when a voice utterance has not been recognized. If, for example, the user happens to be in the situation where he/she wishes to train a new command for a speech recognition system, it is sufficient to articulate a voice utterance which has not yet been used, whereafter the speech recognition system finds a non-recognition of the new voice utterance and then offers the option of assigning the voice utterance to a new command. After the assignment has been performed, the command can be executed immediately.

In a preferred embodiment of the present disclosure, upon non-recognition of the voice utterance by the speech recognition system the user optionally may either repeat the voice utterance or assign a new command to the voice utterance. This embodiment takes into account that a voice utterance can be just outside the range of similarity to a voice utterance to which a desired command has already been assigned. In this case, it is not intended to assign a new voice utterance to a new command. Instead, this voice utterance must be repeated in order to be linked to the already trained command.

Having regard to an initial state of a speech recognition system, it is preferably provided for the method that in the case when no command has yet been assigned to any voice utterance, the speech recognition system, after having been activated, immediately offers the training of a new command. This happens automatically when the speech recognition system naturally does not recognize the first voice utterance and offers the option of training a new command.

In another embodiment of the present disclosure, it can be provided that, upon non-recognition of a voice utterance for a command already trained by the speech recognition system, the user can select the command and assign the voice utterance to this command. This refers to the case where a "poor" version of the voice utterance is present in a database which contains the assignments between voice utterances and associated trained commands, so that a speech recognition frequently fails. It is possible in this case to assign a new voice utterance to the command already trained.

For recognition of a voice utterance, a voice pattern is preferably generated which is assigned to the voice utterance. Such voice patterns, which are based on an extraction of essential voice features of the voice utterance, are also then used in the database which in this case contains an assignment between voice patterns and trained commands. After having been recorded, each voice utterance is converted into a voice pattern which is then processed further, such as for the decision whether it is recognizable or not; i.e., is already present within a range of similarity of a voice pattern in the database.

In this connection, it is preferable to check before a command is assigned to a voice utterance whether a voice utterance is similar to previously stored voice utterances before a command is assigned to a voice utterance. This prevents confusion among different commands from occurring during speech recognition because the associated voice utterances are in each case too similar to one another. For this purpose, a permissible range of similarity can be defined; for example, by using the extraction features for a voice pattern.

The abovementioned method is achieved with regard to a speech recognition system by a speech recognition system for a speaker-dependent recognition of voice including a voice recording device for recording a voice utterance of a user of the speech recognition system, a search engine which is designed for accessing a database which contains an assignment between voice utterances and commands in order to find a command assigned to the voice utterance, and a conversion device for converting the command found due to the voice utterance, the speech recognition system being designed in such a manner that upon non-recognition of the voice utterance, the speech recognition system provides the user with the opportunity to immediately assign the voice utterance to a new command.

Such a speech recognition system allows the method described above to be carried out and, compared with known speech recognition systems, is distinguished by the fact that the training of new commands is made possible in a speech recognition mode.

The voice recording device is preferably connected to a memory in which the voice utterance is temporarily stored and which is connected to the database for reading the voice utterance into the database. This is not the case in known speech recognition systems because in these, the database is directly accessed for a training mode whereas in a speech recognition mode, although a voice utterance is temporarily stored for the operation of the search engine, the memory then used is not designed/linked for reading a voice utterance into the database.

Preferably, a feature extraction device for generating a voice pattern from the voice utterance is provided between the voice recording device and the memory and the voice pattern replaces the voice utterance.

Additional features and advantages of the present disclosure are described in, and will be apparent from, the following Detailed Description and the Figures.

BRIEF DESCRIPTION OF THE FIGURES

FIG. 1 shows a flow chart of a speaker-dependent speech recognition method in connection with the teachings of the present disclosure.

DETAILED DESCRIPTION

A speaker-dependent speech recognition method via a speech recognition system will now be explained with reference to FIG. 1. After a start of the speech recognition system, which is implemented, for example, as a computer system with a display device, a suitable user interface which also contains an activation for a recording of a voice utterance ("push-to-talk" activation) is first displayed to the user. In a first method step 1, a voice utterance of the user/speaker is recorded with the aid of a suitable voice recording device. In a second step 2, a voice pattern of the voice utterance is generated via a feature extraction device, a voice pattern being defined by a combination of extracted characteristic voice features. The voice pattern is temporarily stored in a memory.

In a third step 3, a search engine is used to interrogate whether the voice pattern generated is contained in a database which contains assignments between voice patterns and commands. This database is provided with contents in a training mode of the speech recognition system, the training mode being integrated into the process of a speech recognition. If the voice pattern is recognized as already present in the database and the associated command is found, the command is executed in a fourth step, after which the operating process of the speech recognition system is ended. The sequence from step 1 to step 4 is automatic in the present illustrated embodiment.

If the voice pattern generated is not recognized in the third step 3, the user receives the option of assigning a new command to the unrecognized voice pattern or the unrecognized voice utterance, respectively, via the user interface of the computer system. This takes place in a fifth step 5 of the method. At this point, the speech recognition system is switched into a training mode if the assignment of a new command is desired or automatically performed. As an alternative to the fifth step 5, the user can also trigger a new voice utterance recording with the aid of the user interface so that the process returns to the first step 1 in order to repeat the voice utterance.

If the assignment of a new command to the unrecognized voice pattern is selected, a voice utterance corresponding to the unrecognized voice utterance from the first step is recorded in a sixth step 6. Following this, a voice pattern is generated from the voice utterance recorded in the sixth step 6 in a seventh step 7, in the same manner as in the second step 2 explained above.

In an eighth step 8, a similarity check between the new voice pattern from the seventh step 7 and the voice pattern from the second step 2 is performed. If a desired degree of correspondence between the two voice patterns is not obtained, the method begins again until a satisfactory result for the similarity of the voice patterns generated in the second step 2 and the seventh step 7 is obtained. During this process, the third step 3 and the fifth step 5 can be skipped.

In the eighth step 8, a similarity check also may be performed to see whether the voice pattern of the newly recorded voice utterance is sufficiently distinct compared with the voice patterns already present in the database. If not, the user can be requested to use a different voice utterance for assignment for a new command. The method recommences with this new voice utterance.

Following this, a command is assigned to the voice pattern generated in the second step 2 in a ninth step 9 by a suitable selection of the user with the aid of the user interface of the speech recognition system. For this purpose, the voice pattern is read from the memory in which it was temporarily stored in the second step 2, suitably combined with the voice pattern generated in step 7; e.g., by averaging individual characteristics of both voice patterns and written into the database together with the new command.

In a final step 10, the newly assigned command is executed after which the speech recognition process with integrated training mode is concluded.

It must be emphasized that the execution of a command taking place in the fourth and last step takes place with the aid of a conversion device for converting the command. The command can be, for example the dialing of a telephone number in a communication network or a voice command via which devices connected to a network are controlled.

Naturally, in a simplified embodiment of the method, the performance of the preceding steps 6 to 8 can be omitted when a command is assigned according to the ninth step 9. In this manner, a command is assigned immediately following the interrogation from the fifth step 5. It is also possible to dispense with the immediate execution of the newly trained command (tenth step) during the performance of the method.

Although the present disclosure has been described with reference to specific embodiments, those of skill in the art will recognize that changes may be made thereto without departing from the spirit and scope of the present disclosure as set forth in the hereafter appended claims.

The invention claimed is:

1. A speaker-dependent speech recognition method recognizing speech with a speech recognition system, the method comprising:
 a) recording a voice utterances of a user and generating a first voice pattern;
 b) comparing the first voice pattern with voice patterns previously stored in a database;

upon non-recognition of the first voice pattern:
c) providing the user with an option to assign the voice utterance to a new command, wherein a method for assigning the voice utterance to a new command comprises the steps of:
  d) recording another voice utterance and generating a second voice pattern;
  e) comparing said second voice pattern with said first voice pattern; and
  f) if the comparison shows a predefined degree of similarity then combining the first and second voice pattern and assigning a new command to the combined voice pattern and storing the combined voice pattern in said database, and otherwise repeating steps d) to f).

2. A speaker-dependent speech recognition method as claimed in claim 1, wherein the step of combining the first and second voice pattern comprises the step of averaging individual characteristics of the first and second voice pattern.

3. A speaker-dependent speech recognition method as claimed in claim 1, further comprising the step of:
  e1) comparing the second voice pattern with the voice patterns previously stored in the database and if a similarity is less than a predetermined threshold then recording a new voice utterance which is used to for a subsequent command assignment.

4. A speaker-dependent speech recognition method as claimed in claim 1, wherein upon the non-recognition of a voice utterance for a command already trained by the speech recognition system, the user may select the command and assign the voice utterance to the selected command.

5. A speaker-dependent speech recognition method as claimed in claim 1, wherein upon recognition of the first voice pattern an assigned command is executed.

6. A speaker-dependent speech recognition method as claimed in claim 1, wherein after assigning the new command, the new command is executed.

7. A speech recognition system for a speaker-dependent recognition of voice, comprising:
  a voice recording device for recording a voice utterance of a user of the speech recognition system;
  a search engine for accessing a database which contains an assignment between voice patterns and commands in order to find a command assigned to the voice utterance; wherein the system is configured to perform:
  to generate a first voice pattern from the recorded voice utterance;
  to compare the first voice pattern with voice patterns previously stored in the database;
  upon non-recognition of the first voice pattern:
  to provide the user with an option to assign the voice utterance to a new command, wherein the system if further operable for assigning the voice utterance to a new command:
    to record another voice utterance with said voice recording device and to generate a second voice pattern;
    to compare said second voice pattern with said first voice pattern; and if the comparison shows a predefined degree of similarity, to combine the first and second voice pattern and assigning a new command to the combined voice pattern and to store the combined voice pattern in said database.

8. A speech recognition system as claimed in claim 7, wherein the voice recording device is connected to a memory in which the voice utterance is temporarily stored and wherein the memory is connected to the database for writing the voice utterance into the database.

9. A speech recognition system as claimed in claim 7, further comprising a feature extraction device for generating the first and second voice patterns from the voice utterances, the feature extraction device being arranged between the voice recording device and the memory.

* * * * *